United States Patent
Zhou et al.

(10) Patent No.: US 10,219,108 B1
(45) Date of Patent: Feb. 26, 2019

(54) USE OF POSITIONING REFERENCE SIGNAL CONFIGURATION AS INDICATION OF OPERATIONAL STATE OF A CELL

(71) Applicant: Sprint Spectrum L.P., Overland Park, KS (US)

(72) Inventors: Yu Zhou, Herndon, VA (US); Yu Wang, Fairfax, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/912,845

(22) Filed: Mar. 6, 2018

Related U.S. Application Data

(62) Division of application No. 15/491,580, filed on Apr. 19, 2017, now Pat. No. 9,955,295.

(51) Int. Cl.
| | |
|---|---|
| *H04W 4/02* | (2018.01) |
| *H04W 24/08* | (2009.01) |
| *H04W 24/02* | (2009.01) |
| *H04L 27/12* | (2006.01) |
| *H04W 8/26* | (2009.01) |
| *H04L 5/00* | (2006.01) |
| *H04W 24/10* | (2009.01) |

(52) U.S. Cl.
CPC ............. *H04W 4/02* (2013.01); *H04L 5/0048* (2013.01); *H04L 27/12* (2013.01); *H04W 8/26* (2013.01); *H04W 24/02* (2013.01); *H04W 24/08* (2013.01); *H04W 24/10* (2013.01)

(58) Field of Classification Search
CPC ............... H04W 28/0226; H04W 4/02; H04W 52/0209; H04W 56/006; H04W 72/10; H04W 74/04; H04W 88/02; H04W 88/08; H04W 8/245; H04W 92/10
See application file for complete search history.

(56) References Cited

U.S. PATENT DOCUMENTS

| | | | |
|---|---|---|---|
| 7,787,899 | B1 | 3/2010 | Talley et al. |
| 8,055,293 | B1 | 11/2011 | Vargantwar et al. |
| 9,913,181 | B1 | 3/2018 | Oroskar et al. |
| 2004/0242257 | A1 | 12/2004 | Valkealahti et al. |

(Continued)

OTHER PUBLICATIONS

Sven Fischer, "Observed Time Difference of Arrival (OTDOA) Positioning in 3GPP LTE," Qualcomm Technologies, Inc., Jun. 6, 2014.

(Continued)

*Primary Examiner* — Kwasi Karikari

(57) ABSTRACT

A method and system for using a positioning reference signal (PRS) of a cell to indicate an operational state of the cell. The cell could have two or more candidate PRS configurations defining physical configurations of its PRS, such as frequency positions of air interface resources that carry the cell's PRS. One such PRS configuration could correspond with one operational state of the cell (e.g., heavy cell load), and another such PRS configuration could correspond with a different operational state of the cell (e.g., normal or light cell load). A base station could thus select and apply a particular PRS configuration to indicate operational state of the cell. And an entity such as a wireless client device or neighboring base station could determine the PRS configuration used in the cell as a way to determine the operational state of the cell.

20 Claims, 7 Drawing Sheets

(56) References Cited

U.S. PATENT DOCUMENTS

| | | |
|---|---|---|
| 2005/0059408 A1 | 3/2005 | Tiedemann, Jr. et al. |
| 2005/0250527 A1 | 11/2005 | Jugl et al. |
| 2010/0136979 A1 | 6/2010 | Yang et al. |
| 2010/0222063 A1 | 9/2010 | Ishikura et al. |
| 2011/0255514 A1 | 10/2011 | Olofsson et al. |
| 2011/0299474 A1 | 12/2011 | Li et al. |
| 2012/0046030 A1 | 2/2012 | Siomina et al. |
| 2012/0115541 A1 | 5/2012 | Suga |
| 2012/0208523 A1 | 8/2012 | Hans et al. |
| 2013/0040692 A1 | 2/2013 | Chen et al. |
| 2013/0189971 A1 | 7/2013 | Callender et al. |
| 2014/0355557 A1* | 12/2014 | Peng .................. H04W 16/14 370/330 |
| 2015/0333880 A1 | 11/2015 | Yi et al. |
| 2016/0242083 A1 | 8/2016 | Guan et al. |
| 2016/0269967 A1 | 9/2016 | Suzuki et al. |
| 2018/0160393 A1* | 6/2018 | Zeng .................. H04W 64/006 |

OTHER PUBLICATIONS

Office Action from U.S. Appl. No. 14/835,902, dated Apr. 11, 2017.

\* cited by examiner

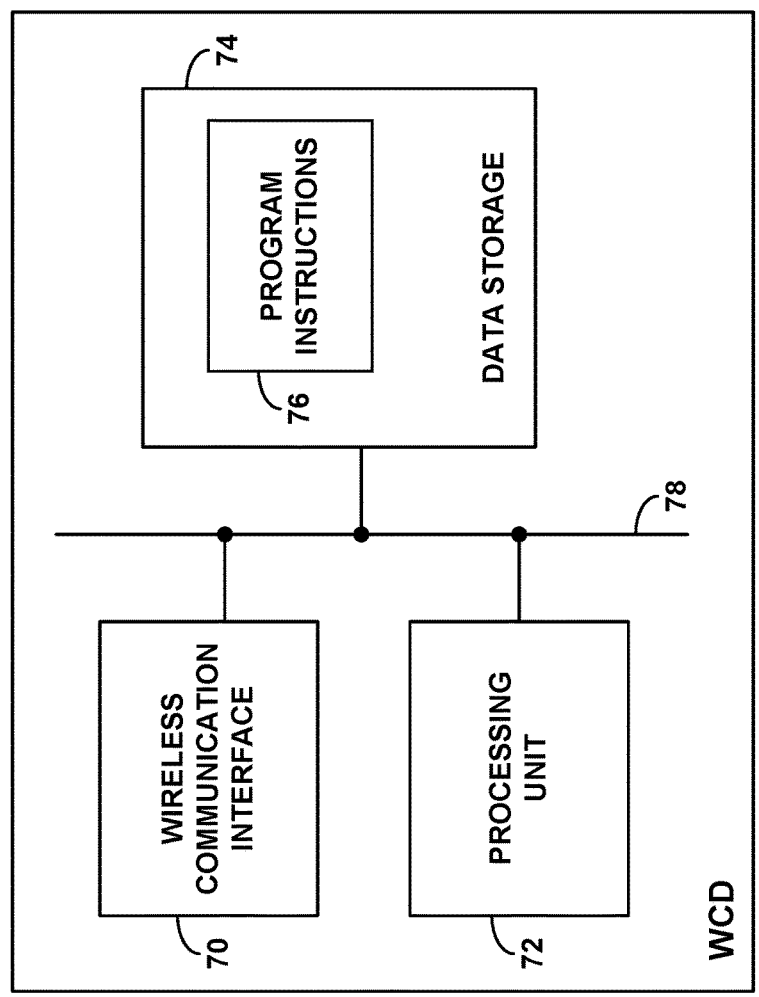

USE OF POSITIONING REFERENCE SIGNAL CONFIGURATION AS INDICATION OF OPERATIONAL STATE OF A CELL

REFERENCE TO RELATED APPLICATION

This is a divisional of U.S. patent application Ser. No. 15/491,580, filed Apr. 19, 2017, the entirety of which is hereby incorporated by reference.

BACKGROUND

A typical wireless communication system includes a number of base stations each radiating to provide one or more coverage areas or "cells" in which to serve wireless communication devices (WCDs) such as cell phones, tablet computers, tracking devices, embedded wireless modules, and other wirelessly equipped devices, whether or not user operated. In turn, each base station may sit as a node on a core access network that includes entities such as a network controller, switches and/or gateways, and the core network may provide connectivity with one or more external transport networks such as the public switched telephone network (PSTN) and the Internet. With this arrangement, a WCD within coverage of a base station may engage in air interface communication with the base station and may thereby communicate via the base station with various remote network entities or with other WCDs served by the base station.

Such a system may operate in accordance with a particular air interface protocol, examples of which include, without limitation, Long Term Evolution (LTE) (using orthogonal frequency division multiple access (OFDMA) and single-carrier frequency division multiple access (SC-FDMA)), Code Division Multiple Access (CDMA) (e.g., 1×RTT and 1×EV-DO), Global System for Mobile Communications (GSM), IEEE 802.11 (WIFI), and BLUETOOTH. Each protocol may define its own procedures for registration of WCDs, initiation of communications, handover between sectors, and other functions.

In practice, each cell in such a system may operate on one or more carrier frequencies and be modulated or otherwise structured in accordance with the air interface protocol to define resources for carrying communications between the base station and WCDs, including downlink communications in the direction from the base station to WCDs and uplink communications in the direction from WCDs to the base station.

Under CDMA, for instance, the air interface of a cell (or sector) is structure to define a group of spread-spectrum coded channels, some of which are reserved as control channels for carrying control signaling between the base station and WCDs and others of which are assignable by the base station to WCDs on an as-needed basis to carry data traffic. And under LTE, the air interface of a cell is divided over time into a continuum of subframes, each subframe is divided over time and frequency into array of resource elements (mostly 15 kHz by 66.7 microseconds) for carrying modulated data, and certain groups of those resource elements are reserved to define control channels for carrying control signaling between the base station and WCDs, while other groups of the resource elements are assignable by the base station to WCDs on an as-needed basis to carry data traffic.

In a representative wireless communication system, one of the control signals provided on the downlink in each cell is a positioning reference signal (PRS), which is useable to facilitate mobile device positioning. In practice, for instance, in each cell, a PRS could be broadcast in each cell on particular air interface resources, and the location of a WCD could be determined based on the WCD's evaluation of the PRS in each of several cells. For example, using an observed time difference of arrival (OTDOA) process, the WCD could measure a time of arrival (TOA) of the PRS respectively from each of multiple base stations and, using one of the TOAs as a reference, differences between the TOAs could be computed and then used along with known locations of the base stations as a basis to estimate the WCD's location.

Overview

In practice, it may be beneficial for a base station to report an operational state of its cell, such as a current load level of the cell (e.g., percent resource utilization, number of served WCDs, level of backhaul load, level of processor load, etc.), a current antenna configuration of the cell, or the like. Such information could help facilitate managing service in the system. For instance, a WCD that is considering whether to be served by a given cell (e.g., whether to initially request service of the cell or whether to continue being served by the cell) could use the reported operational state of the cell as a basis to decide whether to do so. Likewise, a neighboring base station could use the reported operational state of a cell as a basis to control whether to hand over WCDs to the cell, to achieve load-balancing or for other purposes.

A technical difficulty with reporting the operational state of a cell, however, is that doing so could require use of limited air interface resources or other resources. For instance, to report such information to UEs that are not yet connected with the base station, the base station could broadcast the information in a system information message, but doing so could consume limited air interface capacity of such a message. And to report the information to a UE that is currently connected with the base station, the base station could transmit the information in a control message to the UE, but doing so could consume limited air interface capacity for control signaling. Further, to report the information to a neighboring base station, the base station could transmit the information via an inter-base-station network link, but doing so could consume limited capacity of that link. Consequently, an improvement is desired.

Disclosed herein is a method and system that conveniently leverages a cell's PRS broadcast to indicate an operational state of the cell. In particular, the PRS of a cell could be configured in at least two different ways, such as occupying different air interface resources for instance, and each PRS configuration could be correlated with a respective operational state of the cell—such as one PRS configuration being correlated with threshold heavy load of the cell and another PRS being correlated with normal or light load of the cell.

In practice, a base station that provides a cell could thus determine an operational state of the cell and could select a particular PRS configuration correlated with that operational state and broadcast the cell's PRS using the selected PRS configuration. Further, a WCD, neighboring base station, or other entity could evaluate downlink transmission in the cell to determine which PRS configuration is used, and, based on the determined PRS configuration, could determine the operational state of the cell, as a basis to manage service in the system for instance.

Advantageously with this advance, a cell's PRS would conveniently serve the dual purpose of both facilitating mobile device location determination and indicating operational state of the cell. For instance, the PRS could be evaluated as noted above to determine a TOA, which could be factored into a location determination algorithm. And the configuration of the PRS could also be used as an indication of the operational state of the cell.

As noted above, the PRS configuration that is used as an indication of the cell's operational state could relate to which air interface resources are used to carry the PRS. For example, at issue could be which one or more subcarriers, coded channels, or other resource elements are used to carry the PRS, with one configuration corresponding with one operational state of the cell (e.g., heavy cell load) and another configuration corresponding with another operational state of the cell (e.g., normal or light cell load).

Using LTE as a specific example, a base station could broadcast a PRS in a known pattern of resource elements within a group of the cell's resource elements, but the base station could shift the pattern in frequency from a known base position by a certain number of resource elements, ranging from 0 (no shift in frequency) to 5 (shift in frequency by five resource elements). With this arrangement, the operational state of the cell could be indicated by which frequency shift is used for broadcast of the PRS. For instance, one frequency shift could indicate one operational state cell, and another frequency shift could indicate another operational state of the cell.

As a specific example of this, a physical cell identifier (PCI) of the cell could be used as a basis to derive two different frequency shifts for the PRS, such as with a first frequency shift being a modulo 3 function of the PCI (i.e., 0, 1, or 2) and a second frequency shift being 3 resource elements greater than that first frequency shift. One of those two frequency shifts could then be used to indicate a first operational state of the cell (e.g., heavily cell load), and the other of the two frequency shifts could be used to indicate a second operational state of the cell (e.g., normal or light cell load). Other examples are possible as well.

Accordingly, in one respect, disclosed is a method for using a PRS to communicate an operational state of a cell, where a base station broadcasts the PRS in the cell to facilitate mobile device location determination. According the method, the base station would determine the operational state of the cell and, based on the determined operational state of the cell, would select a PRS configuration from a plurality of PRS configurations. And the base station would then broadcast the PRS using the selected PRS configuration.

In another respect, disclosed is a method for using a PRS to communicate an operational state of a cell, where the cell has a PCI, where the cell defines a continuum of subframes each divided over both time and frequency into an array of resource elements, and where the base station broadcasts the PRS in a pattern of resource elements that is shifted in frequency by a frequency shift of from zero to five resource elements from a base position (i.e., either not shifted, or shifted by one to five resource elements in frequency). According to the method, the base station determines the operational state of the cell, and the base station selects from a candidate set of frequency shifts, {S and S' }, a frequency shift to use for broadcasting the PRS, where S is PCI modulo 3, and S' is S+3, and where the selecting is based on the determined operational state of the cell. In turn, the base station then broadcasts the PRS in a pattern of resource elements having the selected frequency shift from the base position.

Still further, in another respect, disclosed is a method operable in a wireless communication system in which a base station provides a cell, where the cell defines a continuum of subframes each divided over both time and frequency into an array of resource elements, and where a PRS is broadcast in the cell by the base station to facilitate location determination. As disclosed, the method involves scanning air interface transmission from the base station in search of the PRS that the base station broadcasts in the cell, and determining, based on the scanning, which of the cell's resource elements carry the PRS. Further, the method includes determining an operational state of the cell based on which of the cell's resource elements carry the PRS, and using the determined operational state of the cell as a basis to manage service in the wireless communication system (e.g., as a basis for a WCD to control whether to seek service in the cell, or as a basis for a neighboring base station to control whether to hand over a WCD to the cell).

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

BRIEF DESCRIPTION OF THE DRAWINGS

FIG. 7 is a simplified block diagram of an example WCD operable in accordance with the disclosure.

DETAILED DESCRIPTION

This description will discuss implementation by way of example in the context of LTE. It will be understood, however, that principles of the disclosure can extend to apply in other scenarios as well, such as with different LTE configurations or with other air interface protocols altogether. More generally, elements, arrangements, and operations may be added, removed, combined, distributed, re-ordered, or otherwise modified. In addition, it will be understood that operations described as being performed by one or more entities may be implemented in various ways, such as by one or more processing units executing program instructions for instance.

Figure 1:
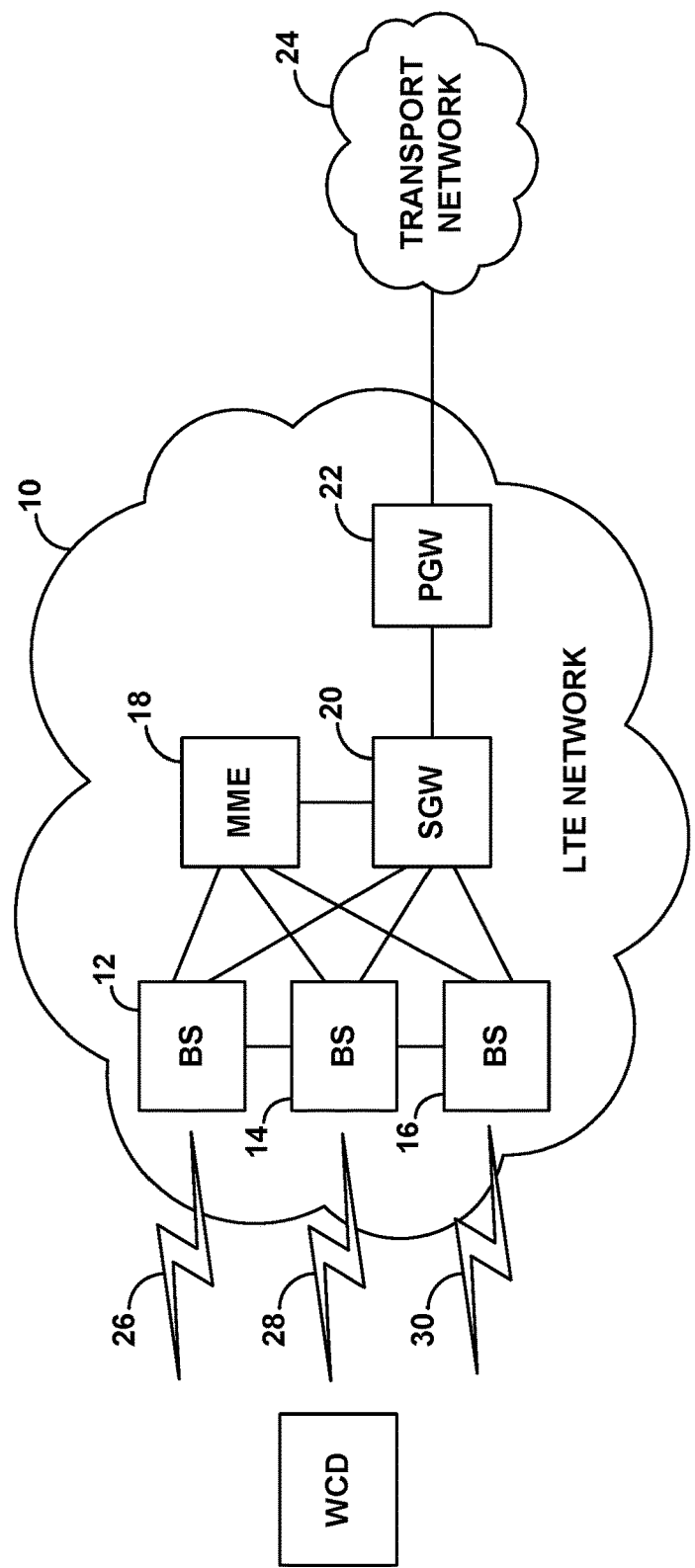
FIG. 1 is a simplified block diagram of an example wireless communication system in which features of the present disclosure can be implemented.

Referring to the drawings, as noted above, FIG. 1 is a simplified block diagram of a wireless communication system in which features of the present disclosure can be implemented. In particular, FIG. 1 depicts an example LTE network 10, which functions primarily to serve WCDs with wireless packet data communication service, but may also provide other functions. The LTE network may be implemented by a wireless service provider and could be structured as a packet-switched network compliant with the industry standard system architecture evolution (SAE) for the LTE protocol. Thus, the entities shown on the network could each have an IP address and be configured to communicate with each other over packet-based tunnels or other communication interfaces, some of which could be dynamically configured as needed to serve WCDs.

As shown, sitting on the LTE network are by way of example several LTE base stations 12, 14, 16 (LTE evolved-Node-B's (eNodeBs)), as well as a mobility management entity (MME) 18, a serving gateway (SGW) 20, and a packet data network (PDN) gateway (PGW) 22, with the PGW then providing connectivity with a packet-switched transport network 24 such as the Internet.

Each illustrated base station includes one or more antennas and associated equipment, such as a radio-frequency transceiver and a power amplifier, for radiating to provide one or more cells, such as example cells 26, 28, 30 as shown. Further, each such base station could take various forms, such as a macro base station of the type typically including a tower-mounted antenna structure or the like and providing a broad range of coverage, or a small-cell, femtocell, picocell, relay, or the like, of the type typically having a smaller form factor and providing a narrower range of coverage.

Under LTE, the carrier frequency of each such cell has a defined frequency bandwidth, such as 1.4 MHz, 3 MHz, 5 MHz, 10 MHz, 15 MHz, or 20 MHz. Further, the air interface on such a carrier is divided over time into a continuum of 10 millisecond frames, each frame is divided into ten 1-millisecond subframes, and each subframe is divided into two 0.5-millisecond timeslots. In a frequency division duplex (FDD) arrangement, the downlink and uplink of the cell would each occupy a separate such frequency range and would each be divided into a respective continuum of the subframes. Whereas, in a time division duplex (TDD) arrangement, the downlink and uplink would share a common frequency range, with certain subframes per frame being designated for downlink use and other subframes per frame being designated for uplink use.

In addition, as noted above, each LTE subframe is then divided over time and frequency into an array of resource elements, each generally occupying a 15 kHz subcarrier and spanning a 66.7-microsecond symbol time segment, with each subframe spanning 14 symbol time segments, and having as many 15 kHz subcarriers as would fit within the carrier bandwidth. Further, the subcarrier of each resource element can be modulated to carry data. For instance, using quadrature phase shift keying (QPSK), the subcarrier of a resource element could be modulated to carry 2 bits of data, and using a higher-order modulation scheme, the subcarrier could be modulated to represent a greater number of bits.

As noted above, certain groups of these resource elements are then reserved for specific purposes.

On the downlink, for instance, the resource elements in the first one, two, or three symbol time segments per subframe are generally reserved to define a control region for carrying control signaling to WCDs, and the resource elements in the remaining symbol time segments per subframe are generally reserved to define a shared channel for carrying downlink data transmissions scheduled by the base station and are grouped into physical resource blocks of 12 subcarriers each.

Moreover, particular resource elements within the downlink control region and shared channel region are reserved for other purposes. For instance, certain centrally located resource elements that recur every five subframes carry synchronization signals that a WCD can read as a basis to determine the PCI of the cell and to establish time synchronization with the cell. Further, certain resource elements distributed throughout the carrier bandwidth are reserved to carry a cell-specific reference signal that WCDs can evaluate to determine coverage strength. And, most pertinent to the present disclosure, certain resource elements within particular physical resource blocks can be used to carry the cell's PRS.

In an example LTE implementation, a cell's PRS is a bit sequence derived in a standard manner from the cell's PCI (which, as noted above, could be determined from the cell's synchronization signals), given particular frame/slot timing. And the PRS bit sequence is then mapped onto a specific pattern of resource elements in certain physical resource blocks of certain subframes. In particular, the PRS bit sequence is modulated onto the subcarriers of the pattern of using QPSK modulation. With this arrangement, an entity monitoring downlink transmission in the cell could thus detect the presence of the cell's PRS bit sequence within that pattern of resource elements and could use the detected PRS as discussed above.

Figure 2:
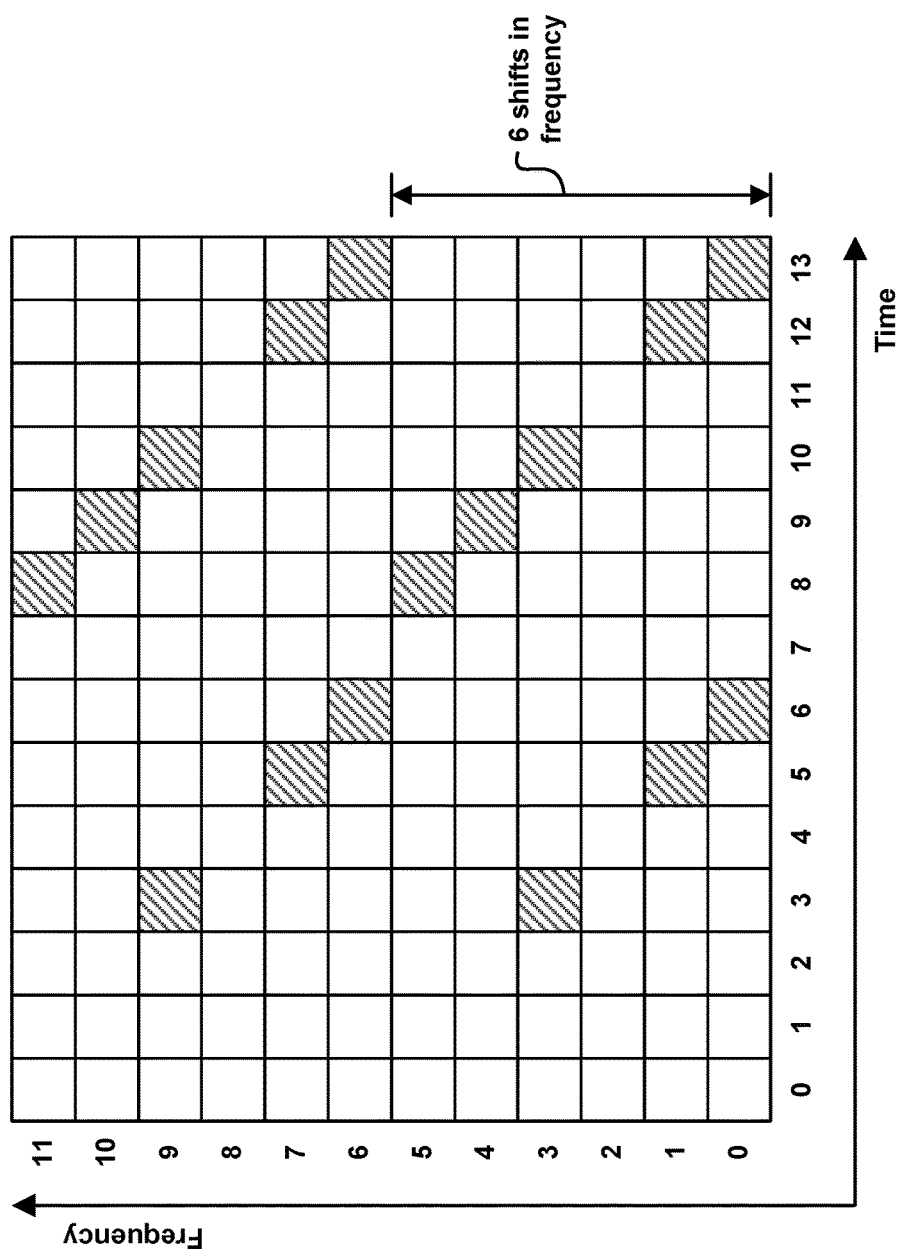
FIG. 2 depicts an example PRS configuration in an example LTE physical resource block.

FIG. 2 depicts an example physical resource block within a representative LTE subframe and depicts an example PRS configuration within the physical resource block. In particular, as shown in the figure, the example physical resource block spans 12 subcarriers in the frequency domain (along the y axis) and 14 symbol segments in the time domain (along the x axis). And the example PRS is then mapped to a specific pattern of resource elements shown shaded. In practice, the base station and other entities that would communicate on the LTE air interface could be programmed with knowledge of this pattern.

In an example LTE implementation, to help distinguish PRS transmissions in neighboring cells that operate on the same carrier frequency as each other, the PRS resource element patterns in neighboring cells could be frequency-shifted in relation to each other. By standard, for instance, a base pattern position could be defined as shown in FIG. 2, and the pattern as a whole could be shifted by up to five resource elements in frequency (five subcarriers), as shown. This would thereby define six possible PRS configurations, one with the PRS resource element pattern at the base position, and each other being shifted as a whole by from one to five resource elements in frequency.

The PRS frequency shift used in a given cell could be defined by the cell's PCI. Namely, to accommodate the six possible frequency shifts, the frequency shift for any given cell could be computed as PCI mod 6, i.e., as the remainder upon dividing the cell's PCI by 6. To help distinguish PRS transmissions in neighboring cells operating on the same carrier frequency as each other, network planners or automated systems could thus configure the cells with PCIs (and thus associated synchronization signals) such that the PCI mod 6 of each neighboring cell would not be the same as the PCI mod 6 of neighboring cells. As a result, the PRS configuration of a given cell (namely the phase shift used for the cell's PRS broadcast) would optimally be different from the PRS configuration of neighboring cells.

In some network configurations, however, it may be sufficient to have just three distinct PRS configurations. This may be the case where, at any given position in the network, there is threshold strong coverage from no more than three cells. Or it may the case in other scenarios or by engineering choice or the like.

Three distinct PRS configurations could be defined as frequency shifts of 0, 1, and 2 resource elements from the base position of the PRS resource element pattern. And to accomplish this in practice, the PRS phase shift used in any given cell could be established as PCI mod 3, rather than PCI mod 6. Alternatively, three distinct PRS configurations could be defined as frequency shifts of 3, 4, and 5 resource elements from the base position of the PRS resource element pattern, which could be established for each cell as (PCI mod 3)+3.

In an example implementation as suggested above, these two different sets of distinct PRS configurations could be used advantageously as a way to indicate the operational state of a cell. In particular, each cell in a network could have a candidate set of two PRS phase shifts (and thus two PRS configurations), with one of the phase shifts being established as PCI mod 3, and the other of the phase shifts being (PCI mod 3)+3, so that the candidate set of phase shifts for the cell would be one of the following: {0, 3}, {1, 4}, and {2, 5}. Of the cell's candidate set of phase shifts in this arrangement, one of the phase shifts could then be correlated with one operational state of the cell (e.g., heavy cell load) and the other phase shift could be correlated with another operational state of the cell (e.g., normal or light cell load).

Making use of this in practice, the base station could thus determine the operational state of the cell and could then select from the cell's candidate set of PRS configurations a PRS configuration that indicates the operational state, and the base station could broadcast the cell's PRS using the selected PRS configuration.

For instance, if the cell's PCI establishes that the cell's candidate set of PRS phase shifts is {0, 3}, the phase shift of 0 might correlate with normal or light cell load, and the phase shift of 3 might correlate with heavy load. If the base station determines that the cell is heavily loaded (e.g., having at least a threshold high level of load), then the base station may select and use a phase shift of 3 for broadcast of the cell's PRS.

Further, a WCD, a neighboring base station, or other entity could monitor downlink transmission in the cell to determine the operational state based on which PRS configuration the cell is using. Here, the entity could know or determine the PCI of the cell and could thereby determine the cell's PRS bit sequence as noted above. Further, the entity could know or determine the cell's candidate set of PRS configurations as noted above. And by demodulating the transmission in the cell, the entity could then determine which PRS configuration, of the cell's candidate set of PRS configurations, is used for broadcast of the cell's PRS bit sequence. Given that, the entity could thereby determine the operational state of the cell as the operational state that corresponds with the determined PRS configuration of the cell.

For instance, continuing with the example above, the entity could determine based on the cell's PCI that the cell's candidate set of PRS phase shifts is {0, 3}, and the entity could determine based on the cell's PCI the PRS bit sequence of the cell. Given this information, the entity could then evaluate the cell's downlink transmission to determine where the PRS pattern of resource elements is on the cell's downlink and thus what PRS phase shift the cell is using. And based on the determined PRS phase shift, the entity could determine the operational state of the cell as the operational state that corresponds with that determined PRS phase shift.

To facilitate this, in practice, the base station that provides the cell could be configured with logic (e.g., a mapping table and/or program logic) that specifies correlations between PRS configurations and cell operational state. For instance, if the candidate set of PRS configurations for the cell is {S, S'}, where S=PCI mod 3, and where S'=S+3, the base station could be configured to correlate PRS configuration S with normal or light cell load and to correlate PRS configuration S' with heavy cell load. Or the base station could be configured to correlate PRS configurations with other cell operational states. Thus, upon determining the operational state of the cell, the base station could thereby determine which PRS configuration to use for its PRS broadcast, and the base station could proceed accordingly.

Likewise, an entity such as a WCD or neighboring base station that might monitor downlink transmission in the cell to determine the operational state of the cell could further be configured with logic that specifies the same correlations between PRS configurations and operational state. In practice, such an entity could be configured in advance by engineering input or the like with such logic, and/or the base station that provides the cell could broadcast or otherwise convey for receipt by the entity a mapping of PRS configuration to operational state, so that the entity could then understand and apply the mapping in practice.

Figure 3:
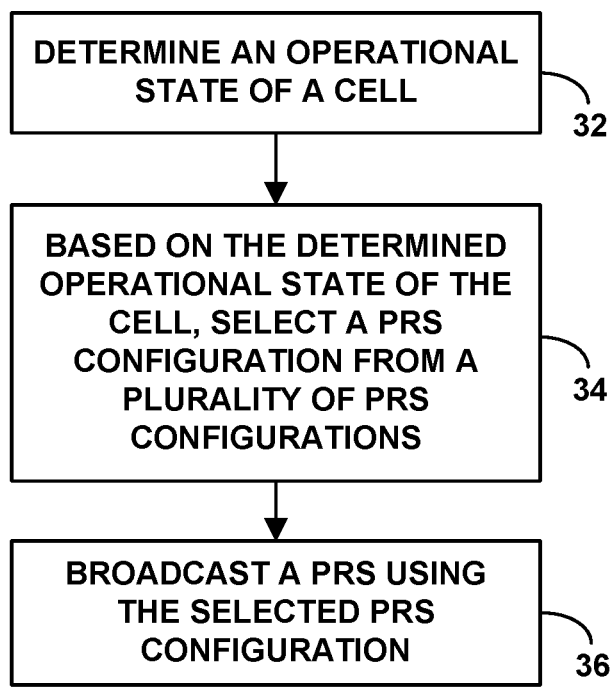
FIG. 3 is a flow chart depicting operations that can be carried out in accordance with the disclosure.

FIG. 3 is next a flow chart depicting a method operable in accordance with the present disclosure, for using a PRS to communicate an operational state of a cell, where a base station broadcasts the PRS in the cell to facilitate mobile device location determination. As shown in FIG. 3, at block 32, the base station determines the operational state of the cell (e.g., through regular monitoring). At block 34, based on the determined operational state of the cell, the base station selects a PRS configuration from a plurality of PRS configurations. And at block 36, the base station broadcasts the PRS using the selected PRS configuration. As noted above, with this process, the PRS can thus serve a dual purpose of both facilitating mobile device location determination and indicating the operational state of the cell.

In line with the discussion above, the operational state of the cell could comprise a load level of the cell and/or one or more operational conditions, configurations, or other states of the cell. Further, the plurality of PRS configurations could be two PRS configurations. And in that case, the act of determining the operational state of the cell could involve determining whether the operational state is a first operational state or rather a second operational state (e.g., making a Boolean decision of whether or not the operational state is a particular state—such as heavy cell load for instance). Further, the act of selecting one of the plurality of PRS configurations could involve (i) selecting the first PRS configuration rather than the second PRS configuration if the operational state is the first operational state rather than the second operational state, and (ii) selecting the second PRS configuration rather than the first PRS configuration if the operational state is the second operational state rather than the first operational state.

Moreover, as discussed above, each PRS configuration of the plurality of PRS configurations could be derived from a PCI of the cell, and the operational state of the cell could be unrelated to the PCI of the cell (e.g., not the PCI itself or a value indicating the PCI).

Further, as discussed above, the base station could broadcast the PRS in a defined pattern of resource elements of the cell, with each PRS configuration having a respective frequency shift that defines a respective quantity of resource elements by which broadcast of the defined pattern is shifted from a reference or base frequency position. And with an arrangement like that discussed above, there could be two PRS configurations, the frequency shift of a first of the two PRS configurations could be S=PCI modulo 3, and the frequency shift of a second of the two PRS configurations could be S+3.

In practice, then, the act of determining the operational state of the cell could involve determining whether the operational state is a first operational state or rather a second operational state. (As discussed above, these operational states could be relative load levels of the cell or could take other forms.) And the act of selecting one of the plurality of the PRS configurations could involve (i) selecting the first PRS configuration rather than the second PRS configuration if the operational state is the first operational state rather than the second operational state, and (ii) selecting the second PRS configuration rather than the first PRS configuration if the operational state is the second operational state rather than the first operational state.

Figure 4:
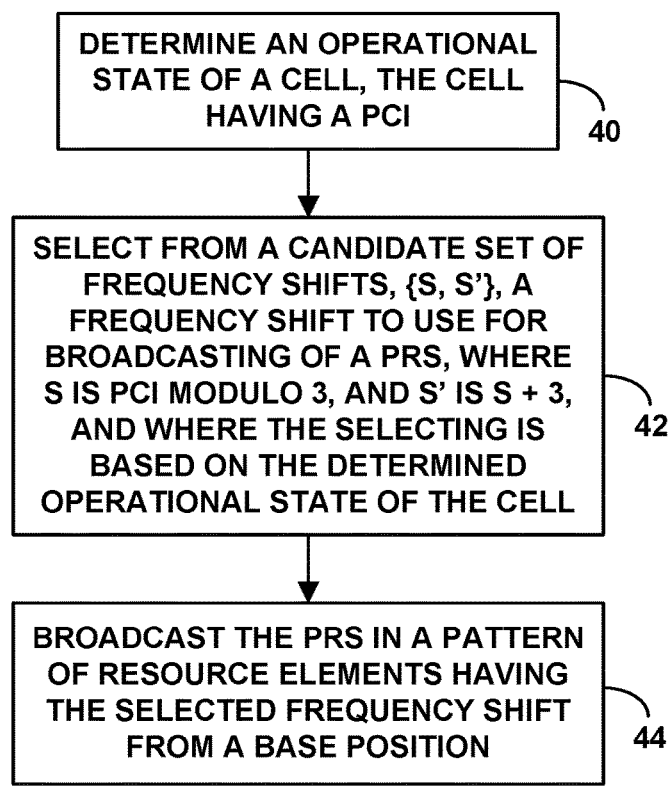
FIG. 4 is another flow chart depicting operations that can be carried out in accordance with the disclosure.

FIG. 4 is next another flow chart depicting a method operable in accordance with the present disclosure, for using a PRS to communicate an operational state of a cell, where the cell has a PCI, where the cell defines a continuum of subframes each divided over both time and frequency into an array of resource elements, and where a base station broadcasts the PRS in a pattern of resource elements that is shifted in frequency by a frequency shift of from zero to five resource elements from a base position.

As shown in FIG. 4, at block 40, the base station determines the operational state of the cell. At block 42, the base station then selects from a candidate set of frequency shifts, {S, S'}, a frequency shift to use for broadcasting of the PRS, where S is PCI modulo 3, and S' is S+3, and where the selecting is based on the determined operational state of the cell. And at block 44, the based station then broadcasts the PRS in a pattern of resource elements having the selected frequency shift from the base position. As discussed above, the broadcast PRS thus serves a dual purpose of facilitating mobile device location determination and indicating, based on the selected frequency shift, the operational state of the cell.

In line with the discussion above, the operational state of the cell could comprise a level of load of the cell, with one of S and S' indicating low cell load and the other of S and S' indicating high cell load, and with the low cell load and high cell load being defined in relation to one or more load thresholds. For instance, "high" cell load could be defined as cell load that is at least as high as a predefined threshold high level of load, and "low" cell load could be defined as cell load that is not as high as "high" cell load and/or that is at least as low as a predefined threshold low level of load.

Further, the method could involve the base station deriving the candidate set of frequency shifts based on the cell's PCI, in which case the act of selecting from the candidate set of frequency shifts the frequency shift to use for broadcasting the PRS could involve selecting the frequency shift from the derived candidate set. And as noted above, the operational state could be unrelated to the PCI of the cell.

Figure 5:
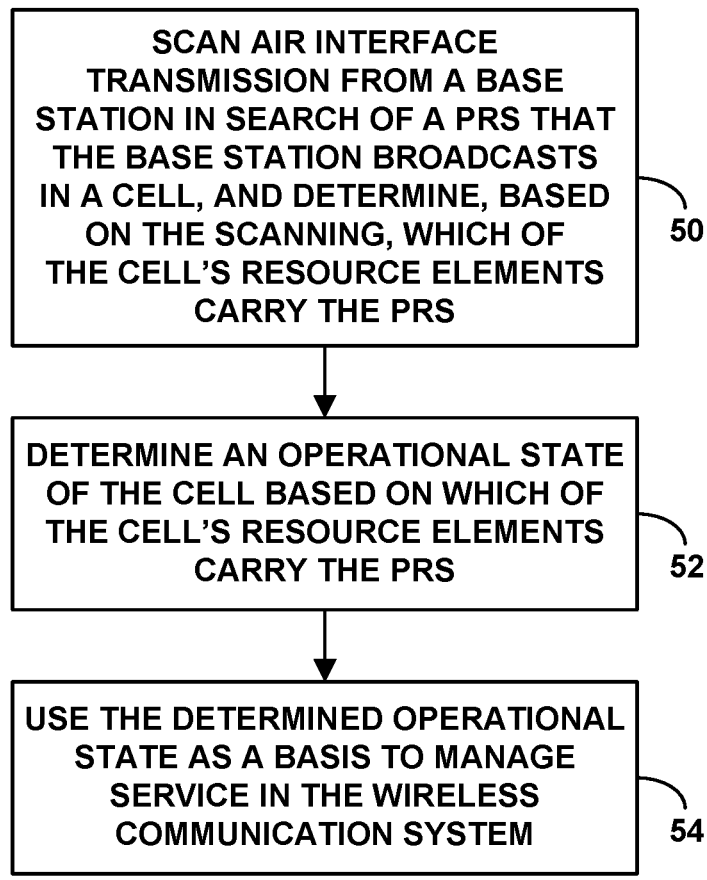
FIG. 5 is another flow chart depicting operations that can be carried out in accordance with the disclosure.

FIG. 5 is next another flow chart depicting a method operable in accordance with the present disclosure, in a scenario where a cell of a wireless communication system defines a continuum of subframes each divided over both time and frequency into an array of resource elements, and where a PRS is broadcast in the cell by the base station to facilitate location determination. As shown in FIG. 5, at block 50, the method involves scanning air interface transmission from the base station in search of the PRS that the base station broadcasts in the cell, and determining, based on the scanning, which of the cell's resource elements carry the PRS. At block 52, the method then involves determining an operational state of the cell based on which of the cell's resource elements carry the PRS. And at block 54, the method involves using the determined operational state as a basis to manage service in the wireless communication system. In this manner, the broadcast PRS could thus again serve a dual purpose of facilitating mobile device location determination and indicating the operational state of the cell.

In line with the discussion above, the cell at issue could have has a PCI, the PRS could be a coded data sequence keyed to the PCI of the cell (e.g., a bit sequence derived from at least the PCI of the cell), and the act of scanning air interface transmission from the base station in search of the PRS that the base station broadcasts in the cell could involve demodulating transmission from the base station in search of the coded data sequence keyed to the PCI of the cell. Further, the PRS could be broadcast in a pattern of the resource elements that has a frequency shift from a base position, in which case determining which of the cell's resource elements carry the PRS could involve determining which frequency shift is used for the broadcast of the PRS.

As discussed above, for example, the cell could have a set of two candidate frequency shifts, {S, S'}, selectively useable for the broadcast of the PRS, where S is PCI modulo 3, and where S' is S+3, in which case the act of determining which frequency shift is used for the broadcast of the PRS could involve (i) determining, based on the PCI of the cell, the set of candidate frequency-shifts of the cell (ii) determining which frequency shift of the determined set of candidate frequency shifts the cell uses for the broadcast of the PRS, such as by determining which resource elements carry the cell's PRS.

Further in line with the discussion above, the act of determining the operational state based on the determining of which of the cell's resource elements carry the PRS could involve determining whether the operational state is a first operational state or rather a second operational state, including (i) if the frequency shift used for the broadcast of the PRS is S rather than S', then determining the operational state is the first operational state rather than the second operational state, and (ii) if the frequency shift used for the broadcast of the PRS is S' rather than S, then determining that the operational state is the second operational state rather than the first operational state.

And as discussed above, for example, the operational state could be a level of load of the cell, with one of the first and second operational states being threshold high load, and the other of the first and second operational states being threshold low load.

Further, the method could be carried out by various entities. For instance, the method could be carried out by a neighboring base station (at least neighboring in the sense that it could detect or otherwise evaluate downlink signals of the cell), with the act of using the determined operational state as a basis to manage operation in the wireless communication system involving using the determined level of load of the cell as a basis for network traffic management, such as to control whether to hand over one or more WCDs to the cell (e.g., for load balancing). Or the method could be carried out by a WCD. And in that case, the act of using the determined operational state as a basis to manage operation in the wireless communication system could involve the WCD using the determined level of load of the cell as a basis to control whether to be served by the base station.

Figure 6:
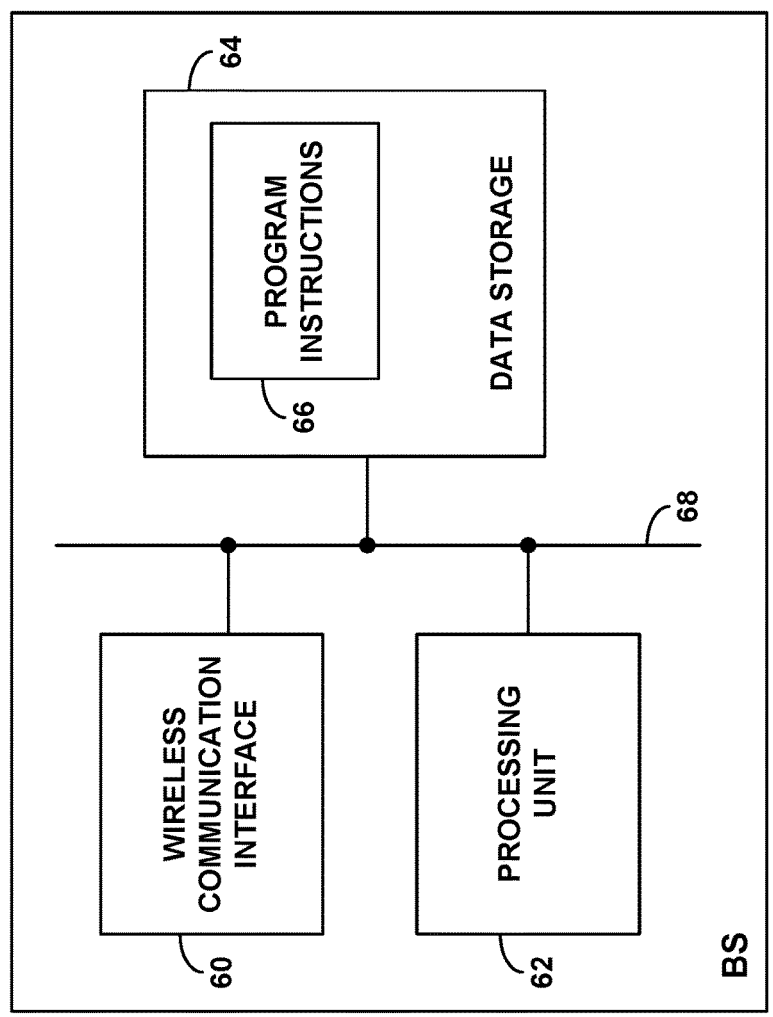
FIG. 6 is a simplified block diagram of an example base station operable in accordance with the disclosure.

FIG. 6 is next a simplified block diagram showing some of the components that could be included in a base station in accordance with the present disclosure. As shown, the base station could include a wireless communication interface 60 (including an radio, a power amplifier, and an antenna structure), a processing unit 62 (e.g., one or more microprocessors and/or dedicated signal processors), and data storage 64 holding program instructions 66 executable by the processing unit 62 to carry out various base station operations described above. And these components could be integrated together or interconnected by a system bus, network, or other connection mechanism 68 as shown.

And finally, FIG. 7 is a simplified block diagram showing some of the components that could be included in a WCD in accordance with the present disclosure. As shown, the WCD could include a wireless communication interface 70 (including an radio, a power amplifier, and an antenna structure), a processing unit 72 (e.g., one or more microprocessors and/or dedicated signal processors), and data storage 74 holding program instructions 76 executable by the processing unit 72 to carry out various operations described above. And these components could be integrated together or interconnected by a system bus, network, or other connection mechanism 78 as shown.

Exemplary embodiments have been described above. Those skilled in the art will understand, however, that changes and modifications may be made to these embodiments without departing from the true scope and spirit of the invention.

We claim:

1. A method for using a positioning reference signal (PRS) to communicate an operational state of a cell, wherein a base station broadcasts the PRS in the cell to facilitate mobile device location determination, the method comprising:
    determining by the base station the operational state of the cell;
    based on the determined operational state of the cell, selecting by the base station a PRS frequency-shift from a plurality of PRS frequency-shifts; and
    broadcasting by the base station the PRS with the selected PRS frequency-shift as an indication of the operational state of the cell,
    whereby the broadcast PRS serves a dual purpose of facilitating mobile device location determination and providing the indication of the operational state of the cell.

2. The method of claim 1, wherein the operational state of the cell comprises a load level of the cell.

3. The method of claim 1, wherein the plurality of PRS frequency-shifts is a first PRS frequency-shift and a second, different PRS frequency-shift,
    wherein determining the operational state of the cell comprises determining whether the operational state is a first operational state or rather a second operational state, and
    wherein selecting one of the plurality of the PRS frequency-shifts comprises (i) selecting the first PRS frequency-shift rather than the second PRS frequency-shift if the operational state is the first operational state rather than the second operational state, and (ii) selecting the second PRS frequency-shift rather than the first PRS frequency-shift if the operational state is the second operational state rather than the first operational state.

4. The method of claim 1, wherein each PRS frequency-shift of the plurality of PRS frequency-shifts is derived from a physical cell identifier (PCI) of the cell.

5. The method of claim 4,
    wherein each PRS frequency-shift defines a respective quantity of resource elements by which broadcast of the defined pattern is shifted from a reference frequency position,
    wherein the plurality of PRS frequency-shifts is two PRS frequency-shifts,
    wherein the first PRS frequency-shift is S=PCI modulo 3, and the second PRS frequency-shift is S+3,
    wherein determining the operational state of the cell comprises determining whether the operational state is a first operational state or rather a second operational state, and
    wherein selecting one of the plurality of the PRS frequency-shift comprises (i) selecting the first PRS frequency-shift rather than the second PRS frequency-shift if the operational state is the first operational state rather than the second operational state, and (ii) selecting the second PRS frequency-shift rather than the first PRS frequency-shift if the operational state is the second operational state rather than the first operational state.

6. The method of claim 5, wherein the operational state comprises a load level of the cell, wherein the first operational state and second operational state define relative load levels of the cell.

7. A base station operable to use a positioning reference signal (PRS) to communicate an operational state of a cell, wherein a base station broadcasts the PRS in the cell to facilitate mobile device location determination, the base station comprising:
    a wireless communication interface;
    a processing unit; and
    data storage,
    wherein the base station is configured to determine the operational state of the cell,
    wherein the base station is configured to select, based on the determined operational state of the cell, a PRS frequency-shift from a plurality of PRS frequency-shifts, and
    wherein the base station is configured to broadcast the PRS with the selected PRS frequency-shift as an indication of the operational state of the cell,
    whereby the broadcast PRS serves a dual purpose of facilitating mobile device location determination and providing the indication of the operational state of the cell.

8. The base station of claim 7, wherein the operational state of the cell comprises a load level of the cell.

9. The base station of claim 7, wherein the plurality of PRS frequency-shifts is a first PRS frequency-shift and a second, different PRS frequency-shift,
    wherein determining the operational state of the cell comprises determining whether the operational state is a first operational state or rather a second operational state, and
    wherein selecting one of the plurality of the PRS frequency-shifts comprises (i) selecting the first PRS frequency-shift rather than the second PRS frequency-shift if the operational state is the first operational state rather than the second operational state, and (ii) selecting the second PRS frequency-shift rather than the first PRS frequency-shift if the operational state is the second operational state rather than the first operational state.

10. The base station of claim 7, wherein each PRS frequency-shift of the plurality of PRS frequency-shifts is derived from a physical cell identifier (PCI) of the cell.

11. A method operable in a wireless communication system in which a base station provides a cell, wherein the cell defines a continuum of subframes each divided over both time and frequency into an array of resource elements, and wherein a positioning reference signal (PRS) is broadcast in the cell by the base station to facilitate location determination, the method comprising:

scanning air interface transmission from the base station in search of the PRS that the base station broadcasts in the cell, and making a determination, based on the scanning, which of the cell's resource elements carry the PRS;

determining an operational state of the cell based on the determination of which of the cell's resource elements carry the PRS; and using the determined operational state as a basis to manage service in the wireless communication system, whereby the broadcast PRS serves a dual purpose of facilitating mobile device location determination and indicating the operational state of the cell.

12. The method of claim 11, wherein the cell has a physical cell identifier (PCI), wherein the PRS is a coded data sequence keyed to the PCI of the cell, and wherein scanning air interface transmission from the base station in search of the PRS that the base station broadcasts in the cell comprises demodulating transmission from the base station in search of the coded data sequence keyed to the PCI of the cell.

13. The method of claim 12, wherein the PRS is broadcast in a pattern of the resource elements that has a frequency shift from a base position, and wherein determining which of the cell's resource elements carry the PRS comprises determining which frequency shift is used for the broadcast of the PRS.

14. The method of claim 13, wherein the cell has a physical cell identifier (PCI), wherein the cell has a set of two candidate frequency shifts, {S, S' }, selectively useable for the broadcast of the PRS, wherein S is PCI modulo 3, and wherein S' is S+3, and wherein determining which frequency shift is used for the broadcast of the PRS comprises:

determining, based on the PCI of the cell, the set of candidate frequency-shifts of the cell; and determining which frequency shift of the determined set of candidate frequency shifts is used for the broadcast of the PRS.

15. The method of claim 14, wherein determining the operational state based on the determining of which of the cell's resource elements carry the PRS comprises determining whether the operational state is a first operational state or rather a second operational state, including (i) if the frequency shift used for the broadcast of the PRS is S rather than S', then determining the operational state is the first operational state rather than the second operational state, and (ii) if the frequency shift used for the broadcast of the PRS is S' rather than S, then determining that the operational state is the second operational state rather than the first operational state.

16. The method of claim 15, wherein the operational state is a level of load of the cell, wherein one of the first and second operational states is threshold high load, and the other of the first and second operational states is threshold low load.

17. The method of claim 16, wherein the base station is a first base station, wherein the method is carried out by a second, neighboring base station, and wherein using the determined operational state as a basis to manage operation in the wireless communication system comprises the neighboring base station using the determined level of load of the cell as a basis for network traffic management.

18. The method of claim 17, wherein using the determined level of load of the cell as a basis for network traffic management comprises using the determined level of load as a basis to determine whether to hand over a wireless communication device to the cell.

19. The method of claim 16, carried out by a wireless communication device (WCD), wherein using the determined operational state as a basis to manage operation in the wireless communication system comprises the WCD using the determined level of load of the cell as a basis to control whether to be served by the base station.

20. The method of claim 11, carried out by a wireless communication device (WCD).

\* \* \* \* \*